(12) United States Patent
Bauer et al.

(10) Patent No.: US 11,801,474 B2
(45) Date of Patent: Oct. 31, 2023

(54) METHOD OF TRANSPORTING HYDROGEN

(71) Applicant: L'Air Liquide, Société Anonyme pour l'Etude et l'Exploitation des Procédés Georges Claude, Paris (FR)

(72) Inventors: André Bauer, Katowice (PL); Piotr Jozwik, Cracow (PL); Dominik Pedzich, Cracow (PL)

(73) Assignee: L'Air Liquide, Société Anonyme pour l'Etude et l'Exploitation Georges Claude, Paris (FR)

( * ) Notice: Subject to any disclaimer, the term of this patent is extended or adjusted under 35 U.S.C. 154(b) by 49 days.

(21) Appl. No.: 17/522,977

(22) Filed: Nov. 10, 2021

(65) Prior Publication Data

US 2022/0143549 A1    May 12, 2022

(30) Foreign Application Priority Data

Nov. 11, 2020 (EP) .................................... 20020520

(51) Int. Cl.
*B01D 53/22* (2006.01)
*B01D 53/04* (2006.01)
*B01D 53/047* (2006.01)

(52) U.S. Cl.
CPC ......... *B01D 53/229* (2013.01); *B01D 53/047* (2013.01); *B01D 53/225* (2013.01); *B01D 2256/16* (2013.01); *B01D 2257/104* (2013.01); *B01D 2257/504* (2013.01); *B01D 2259/40001* (2013.01)

(58) Field of Classification Search
None
See application file for complete search history.

(56) References Cited

U.S. PATENT DOCUMENTS

2010/0322845 A1    12/2010   De Souza
2019/0013532 A1     1/2019   Pollica et al.

FOREIGN PATENT DOCUMENTS

CN         206723836 U       12/2017
EP           2 979 743         2/2016
WO       WO 2019 180032      9/2019

OTHER PUBLICATIONS

Renewable-Energy-Industry.com, Separation of hydrogen from gas mixtures with membranes, URL: https://www.renewable-energy-industry.com/news/press-releases/pm-6661-separation-of-hydrogen-from-gas-mixtures-with-membranes, 2021.
European Search Report for corresponding EP 20020520.1, dated Apr. 29, 2021.

*Primary Examiner* — Youngsul Jeong
(74) *Attorney, Agent, or Firm* — Elwood L. Haynes

(57) ABSTRACT

A method of transporting hydrogen and natural gas by means of a natural gas conduit system is proposed, especially by means of an existing natural gas conduit system. According to the invention, the hydrogen is recovered only downstream of one or preferably multiple natural gas consumers. This resulted in a stepwise increase in the hydrogen content in the natural gas-hydrogen mixture transported, and the subsequent recovery of the pure hydrogen can be affected more easily and efficiently.

9 Claims, 2 Drawing Sheets

METHOD OF TRANSPORTING HYDROGEN

CROSS REFERENCE TO RELATED APPLICATIONS

This application claims the benefit of priority under 35 U.S.C. § 119 (a) and (b) to European Patent Application No. 20020520.1, filed Nov. 11, 2020, the entire contents of which are incorporated herein by reference.

BACKGROUND

Field of the Invention

The invention relates to a method of transporting hydrogen by means of a natural gas conduit system, especially by means of an existing natural gas conduit system.

Prior Art

Natural gas is a mixture of multiple components, with methane constituting the main constituent. Depending on the site of production and further processing methods, it may contain small proportions of hydrogen ($H_2$). For the distribution of natural gas via pipeline grids, authorized hydrogen concentrations are controlled by national laws. In Germany, for example, a maximum hydrogen content of 5% by volume is permitted. (DVGW, 2013. Gasbeschaffenheit [Gas Characteristics]. G 260. Deutscher Verein des Gas-und Wasserfaches e.V.). Thus, the natural gas grid is already suitable for the co-transportation of small amounts of hydrogen.

The ultimate aim of the energy transition from fossil fuels is a carbon-free energy economy. In order to achieve this aim, various companies, political decision-makers and other institutions are currently evaluating feeding of hydrogen from renewable sources such as solar/wind-operated electrolysis or biogas/landfill gas reforming from centralized offshore or onshore wind farms and solar farms and from decentralized small units into the existing natural gas supply grid. This will contribute to transporting renewable hydrogen to end users such as refineries (users with high capacity), hydrogen filling stations (users with low capacity) etc. with utilization of existing infrastructure.

In general, for distribution of the hydrogen, a dedicated supply grid or the changeover of natural gas conduits to hydrogen is envisaged in the long term, although the expected capital costs are enormous. As a bridging technology, therefore, the feasibility of feeding hydrogen into the natural gas pipelines in an order of magnitude of initially 5 to 20 mol % and later up to 50 mol % is being examined, and possible effects on the pipeline system are being assessed, relating, for example, to the effects of the hydrogen content on the pipeline material in respect of corrosion and porosity, and the demands for modification of the system.

The concept of transporting hydrogen in the natural gas grid has long been a topic of discussion and is currently of increased interest, for example within the scope of research projects supported by the EU (e.g. EU Project NaturalHy, EU Project ID: 502661, 2004-2009 or DoE Project "Blending Hydrogen into Natural Gas Pipeline Networks: A Review of Key Issues", Technical Report NREL/TP-5600-51995, March 2013). A central objective in this connection is the safe and efficient recovery of the co-transported hydrogen from the natural gas-hydrogen mixture.

The recovery of hydrogen from refinery offgas is a well-documented and commonly employed method in which, for example, membranes or PSA (pressure swing adsorption) technology are used. This includes the recovery of hydrogen from the return streams, for example from hydrocrackers and hydrotreaters. These streams typically contain a relatively high amount of hydrogen, typically between 50 and 95 mol %, and various hydrocarbon components having carbon numbers of typically $C_1$ to $C_4$, and in the trace region also $C_{4+}$ hydrocarbons.

In the natural gas industry, there is already extensive use of separation methods in order to remove disruptive components, for example hydrogen sulfide ($H_2S$) or carbon dioxide ($CO_2$), or in order to reduce the content of liquid gas components such as propane or butane in natural gas. The technologies employed here include membrane separation, gas scrubbing methods with amine-containing scrubbing agents, and cryogenic gas fractionation.

However, the approach of recovering co-transported hydrogen from a natural gas pipeline grid will also bring new challenges in the separation that do not currently exist in the oil and gas industry:

1. a reduction in the hydrogen content upstream of the natural gas consumers by separation of $H_2$ from the natural gas that has been hydrogen-enriched to between 2 and 50 mol %, for example, down to typically below 0.5 mol % for typical natural gas consumers, this limit resulting from legal or official limitations or specifications by the natural gas consumers,
2. the recovery of pure hydrogen from a mixture of natural gas and hydrogen with purities of >90 mol %, typically up to >99.9 mol % or higher, for further use, it being necessary to supply both centralized large-scale hydrogen consumers (e.g. refineries) and decentralized small-scale hydrogen consumers (e.g. hydrogen filling stations for assurance of $H_2$ mobility) along the natural gas grid,
3. flexible adjustment of the hydrogen content in the hydrogen-enriched natural gas supply grid by multiple decentralized hydrogen and natural gas producers and hydrogen and natural gas consumers, some accepting volumes that fluctuate over time.

With regard to the recovery and purification of hydrogen from hydrogen-enriched natural gas, multiple studies, for example the abovementioned EU or DoE research projects, suggest the use of pressure swing adsorption (PSA), Pd membranes, carbon molecular sieves or electrochemical removal of hydrogen.

However, PSA requires a hydrogen content of greater than 50 to 60 mol % in order to efficiently and economically recover and purify the hydrogen from the hydrogen-enriched natural gas, whereas, in practice, the hydrogen content varies between 5 to 20 mol % up to a maximum of 50 mol %.

Pd membranes would achieve the separation aim, but they are very costly on account of their palladium content and therefore usable only for streams with very low capacity. They also work at very high temperatures of typically about 300° C. and offer only relatively low hydrogen recovery rates, which leads to an increase both in capital costs and operating costs.

Carbon molecular sieves and electrochemical separation of hydrogen have not yet been commercialized and are therefore not yet considered to be a feasible commercial option within the next five to ten years.

Multiple companies have therefore announced commencement of pilot studies with commercial membrane systems; reference is made in this regard, for example, to the Internet page https://www.renewable-energy-industry.com/news/press-releases/pm-6661-separation-of-hydrogen-from-gas-mixtures-with-membranes. However, these tests only take account of experiments with different types of membranes, not the testing of an industrial method of recovering hydrogen from natural gas with the above-discussed requirements, by which the requisite high purity of the hydrogen product in particular is achieved.

Further publications are if anything concerned with the introduction of hydrogen into a natural gas grid or the establishment of a defined hydrogen content therein. For instance, patent specification EP 2979743 B1 discloses a technical solution for keeping the hydrogen content in a hydrogen-enriched natural gas conduit below the legal limits. However, it should be taken into account here that regulatory demands on hydrogen contents may be altered as knowledge is progressively gained. Moreover, the technical solution disclosed requires a large storage volume, for example a salt cavern, in order to be able to establish the hydrogen content in the supply grid. The patent cited also does not address any possible accumulation of carbon dioxide or oxygen in the supply grid using the technical solution described.

Utility model CN 206723836 U describes a means by which hydrogen under relatively low pressure can be mixed effectively into a natural gas grid under relatively high pressure with the aid of specific membranes of the sweep type.

In summary, it can be stated that the prior art currently does not offer any satisfactory technical solution for the separation of hydrogen from a hydrogen-enriched natural gas stream that meets the demands discussed above. There is therefore still a need for effective and efficient methods of transporting hydrogen by means of a natural gas conduit system, and of recovering both the transported natural gas and the co-transported hydrogen.

SUMMARY

It is therefore an object of the present invention to specify such a process that does not have the disadvantages of the prior art that have been mentioned.

All pressures are reported in absolute pressure units, bara for short, or in gauge pressure units, barg for short, unless stated otherwise in the particular individual context.

A further purification, conditioning or processing step of the crude synthesis gas is understood to mean any measure or process step known from the prior art for producing a pure synthesis gas, pure hydrogen and/or pure carbon monoxide. These include CO conversion for increasing the hydrogen proportion in the synthesis gas, separation of carbon dioxide by means of a suitable scrubbing process, for example the Rectisol process, or scrubbing with amine-containing scrubbing media, cryogenic gas fractionation for producing pure carbon monoxide, pressure swing adsorption (PSA) for producing pure hydrogen, and physical process steps, for example cooling, condensing and separating the condensate.

The invention is based on the finding that, in the transporting of hydrogen by means of a natural gas conduit system, the arrangement of a hydrogen withdrawal site downstream of one or preferably multiple natural gas withdrawal sites offers particular advantages since, downstream of the one or more natural gas withdrawal sites, the gas stream discharged is separated by means of membrane separation into a hydrogen-enriched permeate stream and a hydrogen-depleted retentate stream. The methane-enriched retentate stream is released to a natural gas consumer, and the hydrogen-enriched permeate stream is utilized further, for example recycled into the transport conduit of the conduit system downstream of the natural gas withdrawal site. This results in a stepwise increase in the hydrogen concentration in the gas mixture transported, such that pure hydrogen can be recovered particularly efficiently from the hydrogen withdrawal stream(s). Particular advantages are obtained especially when hydrogen is removed by means of multistage membrane separation downstream of the one or more natural gas withdrawal sites and/or downstream of the one or more hydrogen withdrawal sites. Further advantages are obtained especially when the further recovery of pure hydrogen is effected in a PSA system.

In the context of the invention, studies based on comprehensive data from existing hydrogen membrane and PSA systems in operation in refineries and natural gas applications were conducted by transforming these data to the abovementioned aims. The studies included the above-described separation tasks.

It has been found that membranes are capable of mastering the abovementioned challenges, either as independent systems in a one-stage, two-stage or multistage arrangement or in combination with a PSA.

The studies have shown that commercially available polymer membranes in particular, preferably hollow fibre membranes based on polyimide or based on polyamide or other membrane types that are used conventionally for recovery of hydrogen from refinery offgas, are suitable for this purpose—including membranes based on cellulose acetate, polysulfone, polyimide, polyamide, polyaramide inter alia.

Membranes are used on account of the following advantages:

they have higher recovery rates that lead to a lower loss of hydrogen to the natural gas users,
the specification of natural gas under international regulations can be satisfied with conventionally available hydrogen membrane modules (e.g. hollow fibre membranes based on polyimide or based on polyamide),
they enable simple adaptation to different capacities for large and small consumers with high flexibility in normal operation,
given suitable material selection, they are insensitive to any $O_2/CO_2$ content and other impurities in the natural gas transport conduit (pipeline),
with the aid thereof, it is possible to develop a tailored scheme utilizing different feed points for hydrogen and natural gas and different production sites of natural gas and hydrogen consumers.

The use of mobile, modular-assembled membrane systems makes it possible to develop easily installed modularized solutions for small generators, for example onshore wind turbines with local electrolytic hydrogen generation or biogas plants, and/or consumers in the field of hydrogen mobility, which can easily be retrofitted by supplementation of additional membrane units.

A second aspect of the method according to the invention is characterized in that the hydrogen discharge stream is fed to and introduced into a PSA system, and a pure hydrogen stream and at least one PSA offgas stream are discharged from the PSA system. Through the combination of a membrane pre-separation and a PSA post-separation, it is possible to recover a particularly pure hydrogen stream in a particularly efficient manner.

A third aspect of the method according to the invention is characterized in that steps (c) to (f), for further natural gas consumers, are repeated at least once, preferably more than once, most preferably at least twice. This increases the content of the hydrogen co-transported in the natural gas stepwise, which considerably simplifies the downstream recovery of the hydrogen as a pure gas, for example in a downstream PSA system. It is particularly favourable here when there are at least two enrichment steps and/or the hydrogen content is at least greater than 35 mol %, preferably at least 40 mol %, more preferably at least 50 mol %, most preferably at least 60 mol %.

A fourth aspect of the method according to the invention is characterized in that the second natural gas consumer is a steam reforming plant, where the second retentate stream forms part of the steam reforming feed stream. In this way, it is possible to sensibly utilize the second retentate stream. Owing to its elevated proportion of hydrocarbons, for example methane, it is particularly suitable as part of the steam reforming feed stream.

A fifth aspect of the method according to the invention is characterized in that a crude hydrogen stream is produced by means of the steam reforming plant and is introduced into the PSA system for further purification. In most steam reforming plants, the aim of which is to produce hydrogen as main product or by-product, a PSA system constitutes the last workup step for the synthesis gas produced to give pure hydrogen. Since there is thus a PSA system in any case, it can be utilized additionally or simultaneously for recovery of pure hydrogen from the hydrogen co-transported with the natural gas. This results in synergistic effects and advantages with regard to the required equipment and energy consumption.

A sixth aspect of the method according to the invention is characterized in that the first permeate stream and/or the second permeate stream and/or the further permeate streams are compressed. Since the pressure drop over one and especially over two or more membrane separation stages connected in series is significant, it is important to compress the hydrogen-enriched permeate streams in order to be able to introduce them without disruption into the downstream conditioning and further processing stages.

A seventh aspect of the method according to the invention is characterized in that the withdrawal streams, before being fed to a membrane separation apparatus, are heated up, preferably to a temperature of 30 to 100° C. The higher the heating temperature, the lower the residual hydrogen content in the retentate stream for a particular number of membranes, as has been found in studies. Therefore, preference is given to an elevated inlet temperature into the membrane separation apparatus, but this can require provision of a cooler, with the aid of which the permeate stream can be cooled. This is true especially when there are subsequent conditioning or further processing stages that work at comparatively low temperatures, for example a PSA system.

An eighth aspect of the method according to the invention is characterized in that, with regard to the seventh aspect, the withdrawal streams, before being fed to the membrane separation apparatus, are heated up by combustion of a heating gas comprising at least a portion of the retentate stream from the membrane separation apparatus or at least a portion of the permeate stream from the membrane separation apparatus or mixtures of the two. In this way, it is possible to bring about particularly simple and resource-conserving heating of the withdrawal stream(s) before they are fed to a membrane separation apparatus. A portion of the heat required for heating of the starting material may also be recovered from the heat generated by the compressor in the permeate stream, which results in further advantages.

A ninth aspect of the method according to the invention is characterized in that the withdrawal streams, before being fed to a membrane separation apparatus, are fed to a particle separator and/or a droplet separator. These measures contribute to significantly increasing the lifetime of the downstream membrane separation apparatus.

A tenth aspect of the method according to the invention is characterized in that the first permeate stream and/or the second permeate stream and/or the further permeate streams are fed to an oxygen removal apparatus. Oxygen may be present as a trace impurity in natural gas, and tends to leave the membrane separation apparatus with the permeate stream. In order to generate a reliable and on-spec pure hydrogen product stream, therefore, the aftertreatment of the permeate stream in an oxygen removal apparatus offers advantages.

An eleventh aspect of the method according to the invention is characterized in that the first permeate stream and/or the second permeate stream and/or the further permeate streams are fed to a carbon dioxide removal apparatus. Carbon dioxide, too, may be present as a trace impurity in natural gas and tends to leave the membrane separation apparatus with the permeate stream. In order to generate a reliable and on-spec pure hydrogen product stream, therefore, the aftertreatment of the permeate stream in a carbon dioxide removal apparatus offers advantages. This is of particular significance when downstream conditioning or further processing stages are sensitive to carbon dioxide present, for example if the corresponding processes work at low temperatures and frozen carbon dioxide can lead to blockages in the feeds.

A twelfth aspect of the method according to the invention is characterized in that the carbon dioxide removal apparatus comprises at least one apparatus selected from the following group: temperature swing adsorption apparatus (TSA), pressure swing adsorption apparatus (PSA), gas scrubbing apparatus, cryogenic gas fractionation plant.

A thirteenth aspect of the method according to the invention is characterized in that the carbon dioxide removal apparatus comprises a gas scrubbing apparatus and/or a cryogenic gas fractionation apparatus, and the process refrigeration required for operation of these apparatuses is sourced from an air fractionation plant. At many production sites of natural gas or hydrogen consumers, there are also air fractionation plants, and so the corresponding synergies can be utilized. Examples of these include the production sites of plants for methanol synthesis or ammonia synthesis.

A fourteenth aspect of the method according to the invention is characterized in that the first membrane separation apparatus and/or the second membrane separation apparatus and/or a further membrane separation apparatus are configured with multiple separation stages. Advantages here are the compact space-saving design, and the simplicity of exchange as an overall module.

A fifteenth aspect of the method according to the invention is characterized in that the withdrawal streams and/or the permeate streams obtained between the multiple separation stages are compressed to pressures between 20 and 100 bara, preferably between 24 and 80 bara, most preferably between 40 and less than 80 bara, in one example about 60 bara, before being introduced into a downstream separation stage. Studies have shown that these pressure ranges assure optimal working conditions for many membrane separation apparatuses.

A sixteenth aspect of the method according to the invention is characterized in that the hydrogen content of the natural gas transport stream after step (b) is between 5 mol % and 50 mol %, preferably between 5 mol % and 30 mol %, and in that the hydrogen content of the gas streams released to the natural gas consumer is less than 1 mol %, preferably less than 0.5 mol %. In this way, efficient co-transportation of hydrogen with the natural gas is assured, and it is possible to release on-spec natural gas streams to the natural gas consumers.

A seventeenth aspect of the method according to the invention is characterized in that the hydrogen content of the hydrogen discharge stream that is introduced into the PSA system is at least greater than 35 mol %, preferably at least 40 mol %, more preferably at least 50 mol %, most preferably at least 60 mol %. Through the combination of an optionally multistage membrane pre-separation and a PSA post-separation, it is possible to recover a particularly pure hydrogen stream in a particularly efficient manner. Studies show that this is true especially when the minimum values given above for the hydrogen content in the hydrogen discharge stream are observed. It is particularly favourable here when, in the membrane separation, there are at least two enrichment steps by withdrawal of natural gas, and the hydrogen discharge stream enriched in this way is introduced into the PSA system.

An eighteenth aspect of the method according to the invention is characterized in that the second retentate stream is recycled into the transport conduit downstream of the first hydrogen withdrawal site, which gives a hydrogen-depleted natural gas transport stream that is passed onward. In this way, it is possible to minimize natural gas losses without any adverse effect on the recovery of pure hydrogen, since the recovery of the second retentate stream containing the natural gas constituents is only effected downstream of the first hydrogen withdrawal site.

A nineteenth aspect of the method according to the invention is characterized in that the at least one PSA offgas stream is recycled into the transport conduit or fed to a further natural gas consumer. In this way too, it is possible to minimize natural gas losses or to recover high-energy components with a positive contribution to the calorific value. In this connection, it is noteworthy that PSA systems have a poorer hydrogen recovery efficiency than membranes, for example, and so a proportion of hydrogen, for example 15%, is lost to the PSA offgas. It is therefore advantageous in one configuration of the invention to compress the PSA offgas stream and divert it into the feed stream of a membrane separation apparatus, which has a one-stage configuration in one example, such that the apparatus complexity is reduced.

In a further aspect of the invention, it is especially the case that at least one of the natural gas consumers is a partial oxidation plant for partial oxidation of natural gas to synthesis gas. It should be noted here that the presence of significant amounts of hydrogen in the feed stream to the partial oxidation plant is if anything unfavourable when the purpose of the natural gas partial oxidation is to produce a maximum amount of CO for a downstream use, since this would reduce the CO yield. It is therefore advisable first to largely remove the hydrogen from the natural gas/hydrogen mixture by means of an existing or additionally provided membrane separation apparatus, and to feed the retentate thus obtained to the partial oxidation plant as part of the feed stream. The hydrogen-enriched permeate likewise obtained can then either be purified further and used for other purposes or used directly as fuel gas in the partial oxidation plant.

BRIEF DESCRIPTION OF THE DRAWINGS

Developments, advantages and possible applications of the invention are also apparent from the following description of working and numerical examples and the drawings. All features described and/or depicted form, either in themselves or in any combination, the invention, regardless of the way they are combined in the claims or the back-references therein.

DETAILED DESCRIPTION OF PREFERRED EMBODIMENTS

Figure 1:
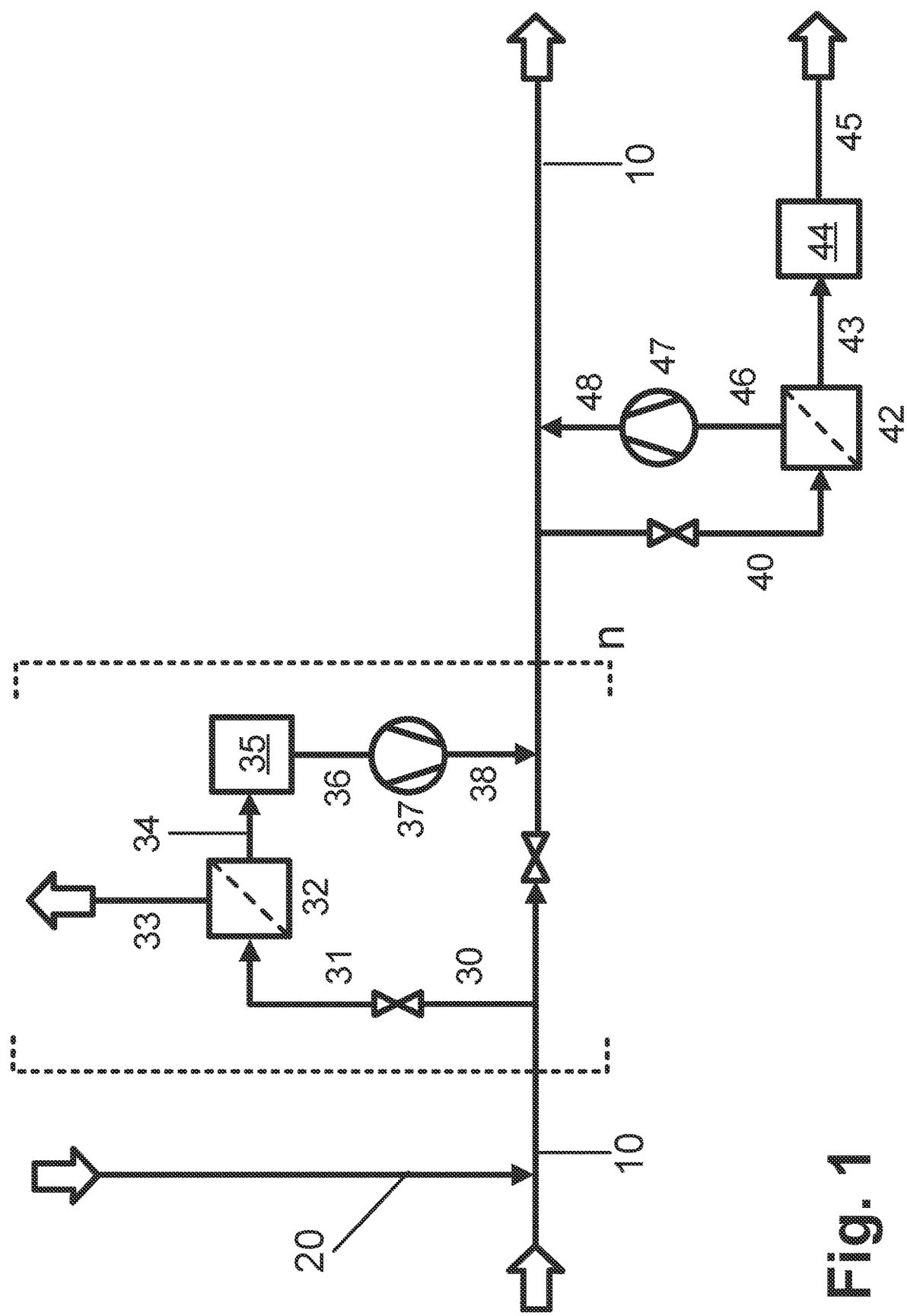
FIG. 1 illustrates a first example of a method or plant for co-transportation of hydrogen in an existing natural gas conduit and for recovering on-spec natural gas and pure hydrogen according to the invention.

FIG. 1 shows a first example of a method or plant for co-transportation of hydrogen in an existing natural gas conduit 10 and for recovering on-spec natural gas and pure hydrogen according to a first configuration of the invention.

Natural gas flows through the transport conduit 10 with a temperature in this example of, for example, 15° C. (depending on the ambient conditions) and a pressure of around 60 bara. Via conduit 20, a hydrogen stream is introduced into conduit 10, so as to give a hydrogen content of about 10 mol % downstream of the hydrogen introduction site.

At the site of the first hydrogen consumer is a first hydrogen withdrawal site at which, via conduit 30, 31 and a dosage valve disposed in the conduit pathway, a substream of the natural gas-hydrogen mixture is discharged from conduit 10. Then the discharged substream is heated up by means of a heater or heat exchanger (not shown) to a temperature of 30 to 100° C., preferably to a temperature of 50 to 90° C., in one example to a temperature of 70 to 80° C., and then conducted onward to and introduced into a first membrane separation apparatus 32. This is preferably followed by a particle separator (likewise not shown) and/or a droplet separator which, by mechanical means, keep particles and liquid droplets away from the downstream membrane separation apparatus, such that the latter is not impaired. In an alternative preferred configuration (not shown), the discharged substream is first guided through a particle separator and/or a droplet separator and subsequently heated before entry into the first membrane separation apparatus 32. This has the advantage that solid particles and/or droplets do not get into the membrane separation apparatus, where they can lead to soiling or to blockages. In addition, the subsequent heating evaporates any entrained and undeposited droplets from the discharged substream, which offers additional protection of the membranes.

The membrane separation apparatus can be operated in a single-stage or preferably multistage manner; in a multistage execution, on account of the pressure drop that occurs over each membrane separation stage, compression between the stages is advantageous.

In the first membrane separation apparatus 32, a first, hydrogen-depleted and methane-enriched, retentate stream is obtained, which is released to the first natural gas consumer as on-spec natural gas via conduit 33 after optional further workup. In an example which is not shown, the gas stream discharged via conduit 33 is cooled by means of a cooler or a heat exchanger before being released to the first natural gas consumer. The same applies, in a further example, to further or preferably all retentate streams released to natural gas consumers. This is important since natural gas consumers are usually set up to process cool natural gas streams, but not to process hot natural gas streams.

In addition, a first, hydrogen-enriched and methane-depleted, permeate stream from the membrane separation apparatus 32 is discharged via conduit 34, having a pressure of typically less than 20 bara, for example 10 bara. Since impurities such as oxygen and/or carbon dioxide that are present in the natural gas have a tendency to leave the membrane separation apparatus via the permeate stream, in one example, the latter is sent to a deoxygenation and/or carbon dioxide removal apparatus 35 in which, by means of purification methods known to those skilled in the art, for example absorption of oxygen-binding adsorbents and/or carbon dioxide removal by means of gas scrubbing, for example with amine-containing scrubbing agents, oxygen and/or carbon dioxide are removed.

The oxygen- and/or carbon dioxide-depleted permeate stream is discharged from the deoxygenation and/or carbon dioxide removal apparatus 35 by means of conduit 36, recompressed to the transport conduit pressure of around 60 bara by means of a compressor 37, and recycled to and introduced into the transport conduit 10 via conduit 38. The introduction is effected downstream of the first natural gas withdrawal site, which gives a hydrogen-enriched natural gas transport stream that is passed onward. Depending on the nature of the apparatus 35, the compressor 37 may also be connected upstream of the apparatus 35.

Figure 2:
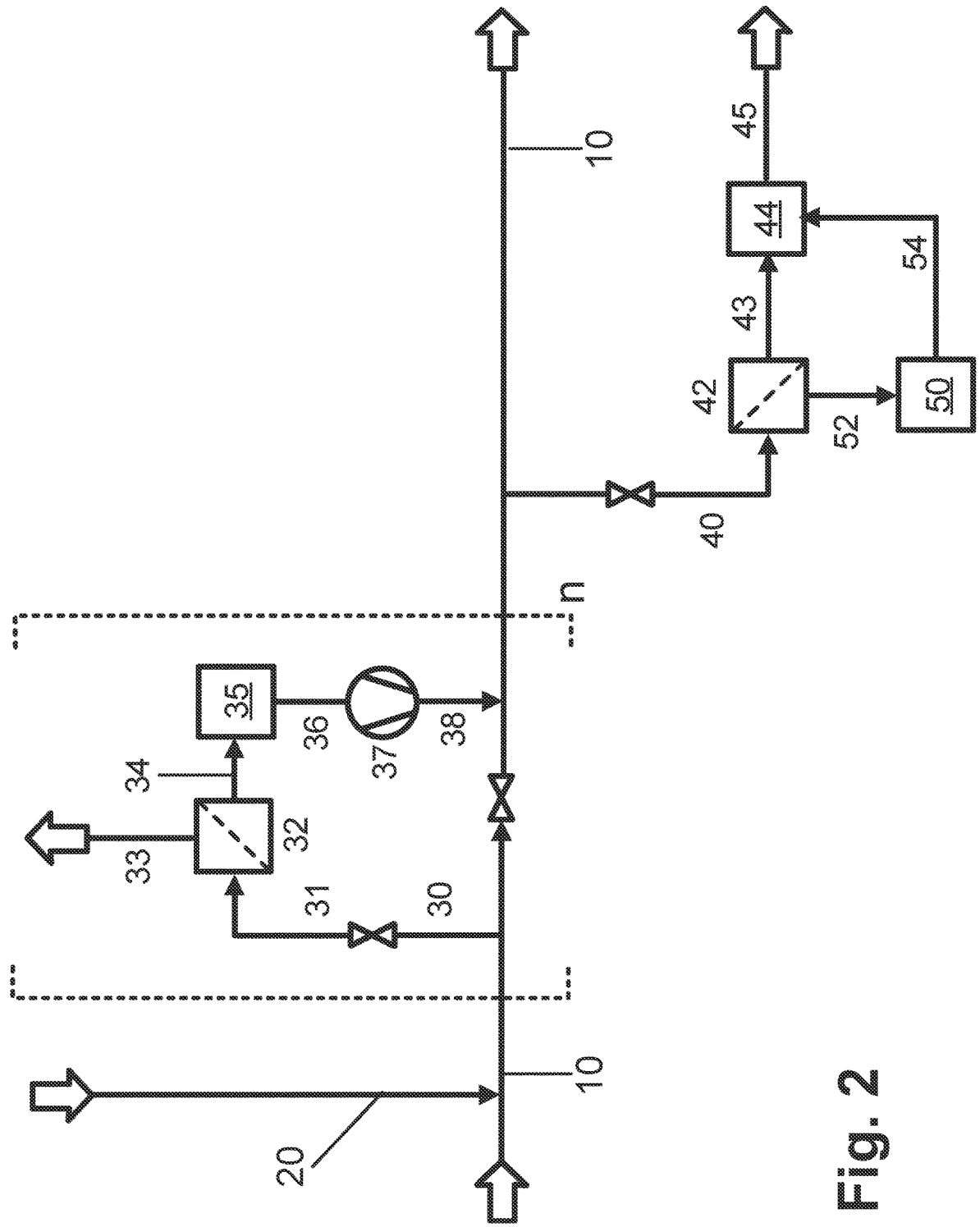
FIG. 2 illustrates a second example of a method or plant for co-transportation of hydrogen in an existing natural gas conduit and for recovering on-spec natural gas and pure hydrogen according to the invention.

The withdrawal of further substreams of the transported natural gas-hydrogen mixture via a further natural gas withdrawal site downstream of the first natural gas withdrawal site and downstream of one another can be effected once or preferably more than once at the site of further natural gas consumers. This is indicated in FIGS. 1 and 2 in that the function block with reference numerals between 30 and 38 is put between dotted square brackets and provided with a multiplier n that symbolizes the number of substream withdrawals and may assume integer values of 1 or greater. Downstream of each functional block n, the hydrogen content in the further-transported natural gas-hydrogen mixture increases, as illustrated in the numerical example that follows. Preference is given to withdrawal of at least two substreams, in one example a withdrawal of at least three substreams, of the transported natural gas-hydrogen mixture upstream of the first hydrogen withdrawal site.

At the site of the first hydrogen consumer, a substream of the natural gas-hydrogen mixture that has been enriched with hydrogen once or preferably more than once, most preferably at least twice, is discharged from the transport conduit 10 as the first hydrogen withdrawal stream via a conduit 40 and a metering valve disposed in the conduit pathway, which forms a first hydrogen withdrawal point. Then the discharged substream is heated up by means of a heater or heat exchanger (not shown) to a temperature of 30 to 100° C., preferably to a temperature of 50 to 90° C. This is preferably followed by a particle separator (likewise not shown) and/or a droplet separator which keep particles and liquid droplets away from the downstream membrane separation apparatus, such that the latter is not impaired. In an alternative preferred configuration (not shown), the hydrogen withdrawal stream is first guided through a particle separator and/or a droplet separator and subsequently heated before entry into a second membrane separation apparatus 42. This has the advantage that solid particles and/or droplets do not get into the membrane separation apparatus, where they can lead to soiling or to blockages. In addition, the subsequent heating evaporates any entrained and undeposited droplets from the discharged substream, which offers additional protection of the membranes.

Then the heated gas stream that has been freed of particles/droplets is guided onward to and introduced into a second membrane separation apparatus 42. The membrane separation apparatus can be operated in a single-stage or preferably multistage manner; in a multistage execution, on account of the pressure drop that occurs over each membrane separation stage, compression between the stages is advantageous.

In the second membrane separation apparatus, the first hydrogen withdrawal stream is separated into a second, hydrogen-depleted retentate stream and a second, hydrogen-enriched permeate stream. The second, hydrogen-depleted and methane-enriched, retentate stream is discharged via conduit 46 from the second membrane separation apparatus, optionally recompressed by means of a compressor 47 and wholly or partly returned to the transport conduit 10 via conduit 48. Alternatively (not shown), the second retentate stream may also be fed wholly or partly to a further natural gas consumer; this would be the second natural gas consumer when n=1.

The second, hydrogen-enriched permeate stream is discharged via conduit 43 from the second membrane separation apparatus as hydrogen discharge stream and, in the working example shown, introduced into a PSA system 44 for generation of pure hydrogen. In the PSA system 44, the hydrogen stream is purified further by multistage pressure swing adsorption under conditions known per se to the person skilled in the art. Via conduit 45, it is then possible to discharge a pure hydrogen stream having a water content of, for example, 99.9 mol % from the PSA system. It is particularly preferable here when the hydrogen content of the hydrogen discharge stream that is introduced into the PSA system is already at least greater than 35 mol %, preferably at least 40 mol %, more preferably at least 50 mol %, most preferably at least 60 mol %. Through the combination of an optionally multistage membrane pre-separation and a PSA post-separation, it is possible to recover a particularly pure hydrogen stream in a particularly efficient manner. Studies show that this is true especially when the minimum values given above for the hydrogen content in the hydrogen discharge stream are observed. It is particularly favourable here when there are at least two enrichment steps in the membrane pre-separation, and the hydrogen discharge stream enriched in this way is introduced into the PSA system.

In a particular configuration of the invention, the entire amount of the natural gas-hydrogen mixture remaining in the transport conduit 10 is discharged as hydrogen discharge stream (not shown). In this configuration, the retentate stream obtained in the membrane separation is recycled into the transport conduit 10 and introduced into the transport conduit 10 upstream of one of the natural gas withdrawal sites, for example the last natural gas withdrawal site before the recovery of hydrogen. In this way, the methane content remaining in the retentate stream can be fed to and utilized by a natural gas consumer, for example the last natural gas consumer.

FIG. 2 shows a second example of a method or plant for co-transportation of hydrogen in an existing natural gas conduit 10 and for recovering on-spec natural gas and pure hydrogen in a second configuration of the invention, which corresponds to the working example shown in FIG. 1 up to reference numeral 45.

By contrast with the working example shown in FIG. 1, in FIG. 2 the methane-enriched and hydrogen-depleted retentate stream is discharged from the second membrane separation apparatus via conduit 52 and fed to a steam reforming plant 50. Alternatively, plant 50 may also be configured as a plant for performing a different method of synthesis gas production, for example as a gasifying plant or as a plant for partial hydrocarbon oxidation. In plant 50, the retentate stream as part of the feed stream comprising hydrocarbons is converted in a manner known to the person skilled in the art to synthesis gas, i.e. hydrogen-carbon monoxide mixtures. After any further enrichment of hydrogen by means of CO conversion and removal of the carbon oxides (neither shown in FIG. 2), the crude hydrogen stream obtained is likewise fed to the PSA system 44 via conduit 54 in order to increase the yield of pure hydrogen.

Numerical Example

The table that follows compiles the physical properties and compositions of a natural gas-hydrogen mixture with 10 mol % of hydrogen transported within a transport conduit upstream of, between and downstream of two natural gas withdrawal sites ("stages").

After passing the two natural gas withdrawal sites ("stages"), the hydrogen content is already around 60 mol %, and after a total of three natural gas withdrawal sites (not shown) the hydrogen content is actually more than 70 mol %. This facilitates the recovery of pure hydrogen in a downstream PSA system.

In the numerical example shown in the table, permeate for stage B with n=2 was introduced as feed stream into the PSA system 44. Conduits 36B and 38B therefore correspond to conduit 40 or 43.

| Conduit Name | 30A Natural gas withdrawal stage 1 | 33A Stage 1 natural gas to consumer | 36A Stage 1 permeate | Stage 1 permeate/ Natural gas withdrawal stage 2 | 36B Stage 2 permeate/ Feed to PSA | 33B Stage 2 natural gas to consumer |
|---|---|---|---|---|---|---|
| Temperature [° C.] | 15 | 72 | 74 | 15 | 76 | 75 |
| Pressure [bara] | 60.0 | 59.2 | 10.0 | 60.0 | 12.0 | 59.2 |
| Molar flow rate [m3(STP)/h] | 38889 | 27178 | 11710 | 11710 | 6185 | 5525 |
| Mass flow rate [kg/h] | 27231 | 20849 | 6382 | 6382 | 2344 | 4038 |
| H2 [mol %] | 10.00 | 0.46 | 32.13 | 32.13 | 60.39 | 0.50 |
| CH4 [mol %] | 84.60 | 93.17 | 64.70 | 64.70 | 35.91 | 96.93 |
| C2 . . . C4+ [mol %] | 3.95 | 5.41 | 0.57 | 0.57 | 0.08 | 1.12 |
| CO2 + N2 [mol %] | 1.45 | 0.95 | 2.60 | 2.60 | 3.62 | 1.45 |

Index A, B relates to values 1, 2 of the multiplier n for number of withdrawal stages

LIST OF REFERENCE SYMBOLS

10 Transport conduit
20 Conduit
30 Conduit
31 Conduit
32 First membrane separation apparatus
33 Conduit
34 Conduit
35 Deoxygenation and/or carbon dioxide removal apparatus
36 Conduit
37 Compressor
38 Conduit
40 Conduit (first hydrogen withdrawal stream)
42 Second membrane separation apparatus
43 Conduit
44 PSA system
45 Conduit
46 Conduit
47 Conduit
48 Conduit
52 Steam reforming plant
54 Conduit

What is claimed is:

1. A method of transporting hydrogen by means of a natural gas conduit system and of recovering pure hydrogen and on-spec natural gas, comprising the following steps:
   (a) providing a natural gas conduit system comprising:
       at least one transport conduit through which a natural gas transport stream flows,
       a hydrogen introduction site,
       at least one natural gas withdrawal site downstream of the hydrogen introduction site and
       a hydrogen withdrawal site downstream of the at least one natural gas withdrawal site,
   (b) introducing a hydrogen introduction stream into the transport conduit through which the natural gas transport stream flows via the hydrogen introduction site,
   (c) discharging a first natural gas withdrawal stream comprising at least a portion of the natural gas transport stream from the transport conduit via a first natural gas withdrawal site,
   (d) feeding the first natural gas withdrawal stream to a first membrane separation apparatus, separating the first natural gas withdrawal stream in the first membrane separation apparatus into a first, hydrogen-depleted retentate stream and a first, hydrogen-enriched permeate stream,
   (e) discharging the first, hydrogen-enriched retentate stream from the first membrane separation apparatus and feeding the first, hydrogen-enriched retentate stream to a first natural gas consumer,
   (f) recycling the first permeate stream into the transport conduit downstream of the first natural gas withdrawal site, which gives a hydrogen-enriched natural gas transport stream that is passed onward,
   (g) discharging a first hydrogen withdrawal stream comprising at least a portion of the hydrogen-enriched natural gas transport stream from the transport conduit via the hydrogen withdrawal site,
   (h) feeding the first hydrogen withdrawal stream to a second membrane separation apparatus, separating the first hydrogen withdrawal stream in the second membrane separation apparatus into a second, hydrogen-depleted retentate stream and a second, hydrogen-enriched permeate stream, (i) discharging the second, hydrogen-enriched permeate stream from the second membrane separation apparatus as hydrogen discharge stream, and (j) discharging the second, hydrogen-depleted retentate stream from the second membrane separation apparatus and recycling the second, hydrogen-enriched retentate stream into the transport conduit downstream of the hydrogen withdrawal site.

2. The method according to claim 1, wherein the hydrogen discharge stream is fed to and introduced into a PSA system, and a pure hydrogen stream and at least one PSA offgas stream are discharged from the PSA system.

3. The method according to claim 1, wherein steps (c) to (f), for further natural gas consumers, are repeated at least once, which affords a repeatedly hydrogen-enriched natural gas transport stream that is passed onward.

4. The method according to claim 1, wherein the second, hydrogen-depleted retentate stream is transported to a second natural gas consumer that is a steam reforming plant, where the second, hydrogen-depleted retentate stream forms part of a steam reforming feed stream.

5. The method according to claim 4, wherein a crude hydrogen stream is produced by means of the steam reforming plant and is introduced into a PSA system for further purification.

6. The method according to claim 1, wherein the first, hydrogen-enriched permeate stream and/or the second, hydrogen-enriched permeate stream are compressed.

7. The method according to claim 1, wherein a hydrogen content of the natural gas transport stream after step (b) is between 5 mol % and 50 mol %, and in that a hydrogen content of the first, hydrogen-depleted retentate stream fed to the first natural gas consumer is less than 1 mol %.

8. The method according to claim 1, wherein a hydrogen content of the hydrogen discharge stream that is introduced into a PSA system is at least 35 mol %.

9. The method according to claim 1, wherein the second, hydrogen-depleted retentate stream is recycled into the transport conduit downstream of the first hydrogen withdrawal site, which gives a hydrogen-depleted natural gas transport stream that is passed onward.

* * * * *